(12) United States Patent
Ridel et al.

(10) Patent No.: US 8,958,439 B2
(45) Date of Patent: Feb. 17, 2015

(54) MEDIATING METHOD AND SYSTEM BETWEEN SIGNALING NETWORK PEERS

(75) Inventors: Lenny Ridel, Hod Hasharon (IL); Gil Shafran, Kfar-Sava (IL)

(73) Assignee: F5 Networks, Inc., Seattle, WA (US)

( * ) Notice: Subject to any disclaimer, the term of this patent is extended or adjusted under 35 U.S.C. 154(b) by 619 days.

(21) Appl. No.: 13/195,265

(22) Filed: Aug. 1, 2011

(65) Prior Publication Data

US 2012/0033681 A1   Feb. 9, 2012

Related U.S. Application Data

(60) Provisional application No. 61/344,481, filed on Aug. 3, 2010.

(51) Int. Cl.
  *H04J 3/22* (2006.01)
  *H04L 12/24* (2006.01)
  *H04L 29/06* (2006.01)

(52) U.S. Cl.
  CPC .......... *H04L 41/022* (2013.01); *H04L 41/0226* (2013.01); *H04L 69/08* (2013.01)
  USPC ............................. 370/467; 709/225; 709/228

(58) Field of Classification Search
  CPC ................... H04L 29/06163; H04L 29/06068; H04L 29/0616
  USPC ................ 370/465–467, 395.2; 709/225, 228
  See application file for complete search history.

(56) References Cited

U.S. PATENT DOCUMENTS

| | | | |
|---|---|---|---|
| 5,828,847 A | 10/1998 | Gehr et al. | |
| 5,987,523 A | 11/1999 | Hind et al. | |
| 6,064,671 A | 5/2000 | Killian | |
| 6,182,139 B1 | 1/2001 | Brendel | |
| 6,185,619 B1 | 2/2001 | Joffe et al. | |
| 6,356,541 B1 | 3/2002 | Muller et al. | |
| 6,748,416 B2 | 6/2004 | Carpenter et al. | |
| 7,099,277 B2 | 8/2006 | Sahinoglu et al. | |
| 8,170,055 B2 * | 5/2012 | Fang et al. | 370/466 |

(Continued)

OTHER PUBLICATIONS

Akkiraju, P., et al., Enabling Enterprise Multihoming with Cisco IOS Network Address Translation (NAT), White Paper, Cisco Systems, Inc., 1997, pp. 1-26.

(Continued)

*Primary Examiner* — Christopher Grey
(74) *Attorney, Agent, or Firm* — LeClairRyan, a Professional Corporation

(57) ABSTRACT

The present invention disclose a system and method for mediating between signaling network peers of diameter type, where each peer is associated with different telecommunication service providers network or different application vendors. The method comprise the steps of: identifying equipment application type and release version of each provider based on pre-defined automatic identification classification rules and profile, classifying the vendor of the implemented diameter application in each signaling peer, retrieving a first set of rules adapted for the identified source equipment type, intercepting messages of communication session between signaling peers of different providers, applying steering rules on outgoing requests for selecting the destination route of target peers, retrieving a second set of conversion rules adapted for the identified destination equipment type vendor application relating to messages structure, content types and content values and applying all conversion rules on intercepted messages for translating between messages formats of the different signaling peers.

14 Claims, 8 Drawing Sheets

(56) References Cited

U.S. PATENT DOCUMENTS

| | | | |
|---|---|---|---|
| 8,218,572 B2* | 7/2012 | Moran et al. | 370/467 |
| 2003/0126200 A1 | 7/2003 | Wolff | |
| 2003/0195984 A1 | 10/2003 | Zisapel et al. | |
| 2006/0268893 A1 | 11/2006 | Lataretu | |
| 2007/0086335 A1 | 4/2007 | McCanne et al. | |
| 2008/0151860 A1 | 6/2008 | Sakoda et al. | |
| 2008/0151931 A1* | 6/2008 | Moran et al. | 370/465 |
| 2010/0039937 A1 | 2/2010 | Ramanujan et al. | |
| 2010/0246602 A1 | 9/2010 | Barreto et al. | |
| 2013/0260731 A1* | 10/2013 | Vihtari et al. | 455/418 |
| 2013/0346549 A1* | 12/2013 | Craig et al. | 709/217 |

OTHER PUBLICATIONS

Bates, T., et al., "Scalable Support for Multi-homed Multi-provider Connectivity", Network Working Group, RFC 2260, Jan. 1998, pp. 1-12.

Dierks, T., et al., "The TLS Protocol", Network Working Group, RFC 2246, Jan. 1999, version 1.0, pp. 1-75.

Needham J., "Link Load Balancers Smooth Web Traffic", F5 Networks Inc., Network World Fusion, Sep. 16, 2002, pp. 1, (http://www.f5.com/about/news/news-articles/archive/20020916).

F5 Networks Inc., "A Link Load Balancing Solution for Multi-Homed Networks", F5 Networks Inc., White Paper, Oct. 2004, pp. 1-6.

F5 Networks Inc., "High availability and intelligent routing for multi-homed networks", F5 Networks Inc., BIG-IP Link Controller, 2003, pp. 1-5.

F5 Networks Inc., "BIG-IP® Link Controller Reference Guide", F5 Networks Inc., Manuel-0054-00, 2002, version 4.3, pp. 1-344.

F5 Networks Inc., "BIG-IP® Link Controller Solutions Guide", F5 Networks Inc., Manuel-0053-01, 2002, version 4.5, pp. 1-70.

Freier A., et al., "The SSL Protocol", Transport Layer Security Working Group, Nov. 18, 1996, version 3.0, pp. 1-65.

DARPA Internet Program, "Transmission Control Protocol", Protocol Specification, RFC: 793, Sep. 1981, pp. 1-82.

U.S. Appl. No. 12/623,919, filed Nov. 23, 2009, entitled "Methods for Controlling Network Congestion by Activating Loss Control and Devices Thereof," to Amdahl et al.

U.S. Appl. No. 12/706,459, filed Feb. 16, 2010, entitled "Methods and Devices for Controlling Network Congestion," to Amdahl et al.

* cited by examiner

MEDIATING METHOD AND SYSTEM BETWEEN SIGNALING NETWORK PEERS

CROSS-REFERENCE TO RELATED PATENT APPLICATIONS

This application claims the benefit of Provisional patent application No. 61/344,481 filed on Aug. 3 2010, which is incorporated herein by reference in its entirety.

TECHNICAL FIELD

The present invention relates to the field of data communications services, and more particularly, to LTE, 4G, NGN network services.

BACKGROUND ART

The known gateway servers which support communication between client nodes and provider servers require customization for configuring the gateway for adapting between the different protocols of the client peer nodes and provider's servers.

Diameter protocol is a flexible signaling protocol and can be dynamically customized and adjusted by the user according to his needs, by using Vendor Specific Attribute Value Pairs (AVP's).

This flexibility is one on the driving forces for Diameter protocol adoption. From the other hand, it introduces a large base of interoperability and security issues for telecommunication service providers implementing Diameter based functionalities in their networks with Diameter based interfaces.

When Diameter based signaling is performed between different telecommunication service providers—process named roaming, there is no guarantee that the network functionality that was validated in its home domain will perform reliably and securely for signaling incoming from other telecommunication service providers.

Since Diameter based roaming signaling is widely adopted, a home network is expected to receive Diameter commands from other networks (other telecommunication service providers) with varying messages structure, content types and content values. These introduce both security and interoperability problem.

SUMMARY OF INVENTION

According to some embodiments of the present invention, there is provided a mediating method between signaling network peers of Diameter type, where each peer is associated with different telecommunication service providers network and/or different application vendors. The method comprise the steps of: identifying equipment application type and release version of each provider or vendor based on pre-defined automatic identification classification rules and profile, classifying the vendor of the implemented diameter application in each signaling peer, retrieving a first set of rules adapted for the identified source equipment type, intercepting messages of communication session between signaling peers of different providers, applying access control rules for validating intercepted messages, applying steering rules on outgoing requests for selecting the destination route of target peers, retrieving a second set of conversion rules adapted for the identified destination equipment type vendor application relating to messages structure, content types and content values, applying filtering rules on communication session data eliminating redundant information and applying all conversion rules on intercepted messages, for translating between messages formats of the different signaling peers.

According to some embodiments of the present invention the translating process includes converting the intercepted messages to normalized format, and retranslating the normalized massages according to the receiving signaling peer format.

According to some embodiments of the present invention the translation process includes testing that the message identified format is in compliance with conversion rules relating at least one provider, wherein non compliant messages are rejected.

According to some embodiments of the present invention the filtering rules include checking that each value of the messages fields, is in compliance with the Network functionality or Security requirements, and replacing non complaint values with a valid values corresponding to the receiving signaling peer format.

According to some embodiments of the present invention the access control rules include checking that each value of the messages fields, is in compliance with the Network functionality or Security requirements, and rejecting the message.

According to some embodiments of the present invention the step of applying at least one of compression rules, acceleration rules or optimization rules.

According to some embodiments of the present invention the peer application is MME or HSS, or any other types of peers.

According to some embodiments of the present invention the steering rules further apply routing policy and/or load balancing policy.

According to some embodiments of the present invention the step of applying at least one of compression, acceleration, or optimization rules on outgoing messages, wherein the rules are applied in accordance with path route to selected peer.

According to some embodiments of the present invention, there is provided a mediating system between signaling network peers of Diameter type, where each peer is associated with different telecommunication service provider's network and/or different peer application vendors. The system comprise the modules of: first classification module for identifying equipment application type and release version of each provider or vendor based on pre-defined automatic identification classification rules (peer profile) and retrieving first set of conversion rules adapted for each identified equipment type, a second classification module for classifying the vendor of the implemented diameter application in each signaling peer and retrieving second set of conversion rules adapted for each identified vendor application relating to messages structure, content types and content values, a monitoring module intercepting messages of communication session between signaling servers of different providers, an authentication module applying access control rules validating intercepted messages, a steering module for applying steering rules on outgoing requests for selecting the destination rout of target peers, a conversion module applying all conversion rules on intercepted messages, for translating between messages formats of the different signaling servers and a security module for applying filtering rules on communication session data eliminating redundant information.

According to some embodiments of the present invention the translating process includes converting the intercepted messages to normalized format, and retranslating the normalized massages according to the receiving signaling server format.

According to some embodiments of the present invention the translation process includes testing that the message identified format is in compliance with conversion rules relating at least one provider, wherein non compliant messages are rejected.

According to some embodiments of the present invention the filtering rules includes checking that each value of the messages fields, is in compliance with the network functionality or security requirements, and replacing non complaint values with a valid values corresponding to the receiving signaling server format.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides methods and systems for mediating method between signaling network peers of Diameter type of different providers. Each signaling peer may have different type of message formats and policy rules, hence when communicating between different peers it is required to mediate in between for enabling secure and optimized communication.

Figure 1:
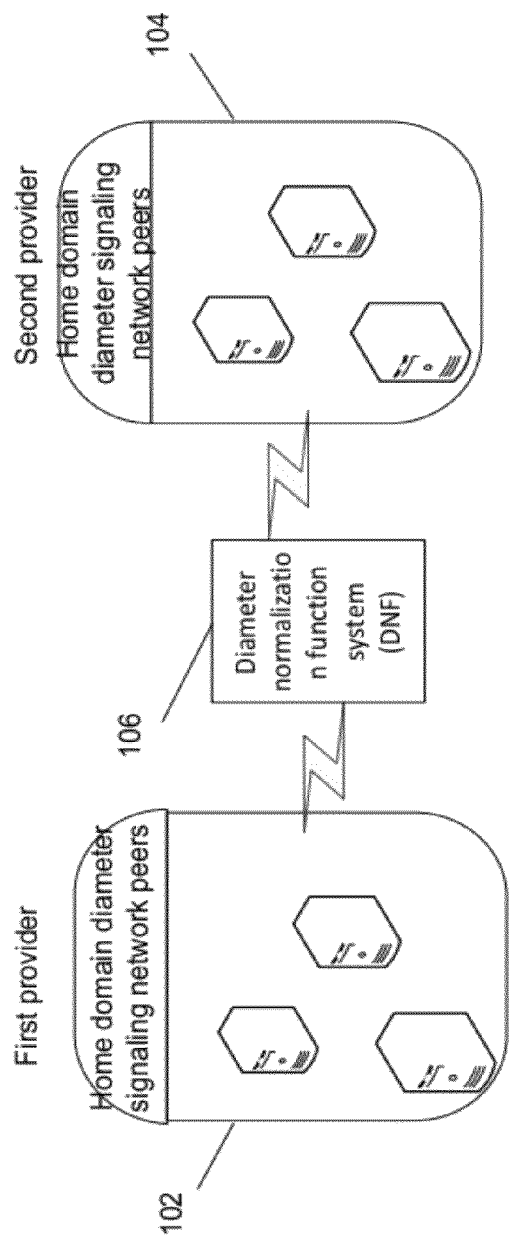
FIG. 1 is a in a overview of environment in which the present invention is practiced according to some embodiments of the invention.

FIG. 1A is a in an overview of environment in which the present invention is practiced according to some embodiments of the invention. Home domain diameter signaling network peers of a first provider 102 communicate with signaling peer of provider 104 through Diameter normalization function system (DNF) 106. The DNF may be implemented as external component serving as access point for each signaling peer or as internal part of the Home domain Diameter signaling network peers of each provider.

Figure 2:
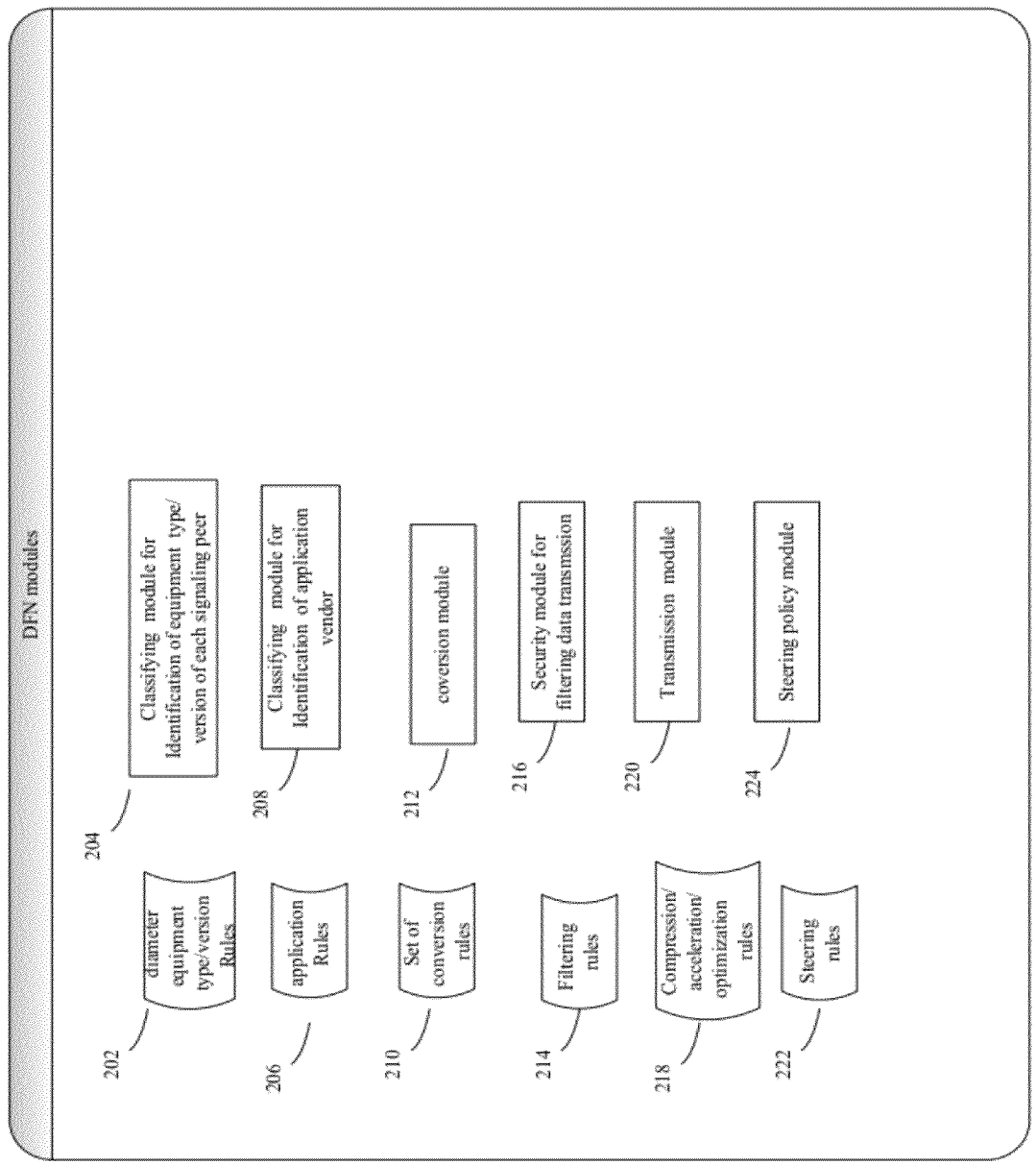
FIG. 2 is a block diagram of Diameter normalization function system (DNF) components according to some embodiments of the invention.

FIG. 2 is a block diagram of Diameter normalization function system (DNF) components according to some embodiments of the invention. The DNF comprises several modules and databases which enable the communication between the peers: modules for identifying the types of equipment and software: a first classification module 204 for Identification of equipment type/version of each signaling peer, the classification is based on known Diameter equipment type/version, e.g. MME application rules 202 which differentiate between the equipment types according information formats which are associated with each type or version and a second classification module 206 for identifying application vendor. The communication messages between the different peers is processed by several modules: conversion module 212 translates message between specific peers formats and normalized format according to set of conversion rules 210, security module 216 for filtering messages and their content based on filtering rules 214, steering policy module for routing messages according to steering rules 222 and transmission module for modifying the messages according to compression, acceleration or optimization rules 218.

Figure 3:
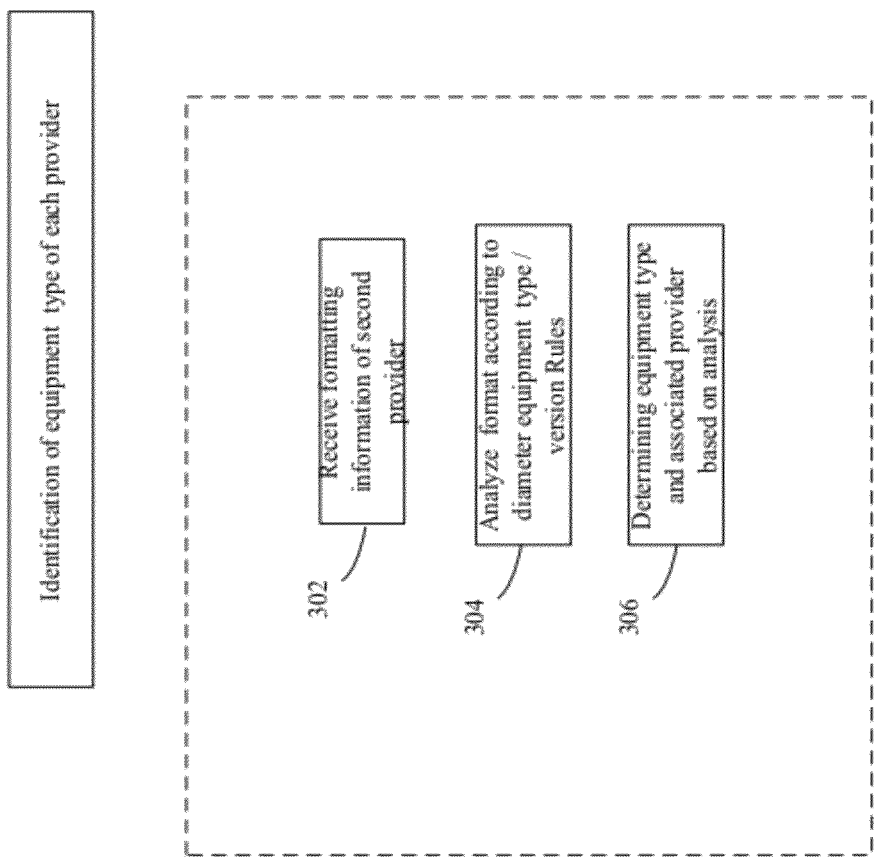
FIG. 3 is a flow chart illustrating the method of Identification of equipment type of each provider according to some embodiments of the invention.

FIG. 3 is a flow chart illustrating the method of Identification of equipment type of each provider according to some embodiments of the invention. This first classification module receives format information from the originator peer (step 320) and analyzes the information format according to predefined rules (step 322) for identifying the equipment type or version used by the originator peer. The messages format has differentiation between different providers and vendors.

Figure 4:
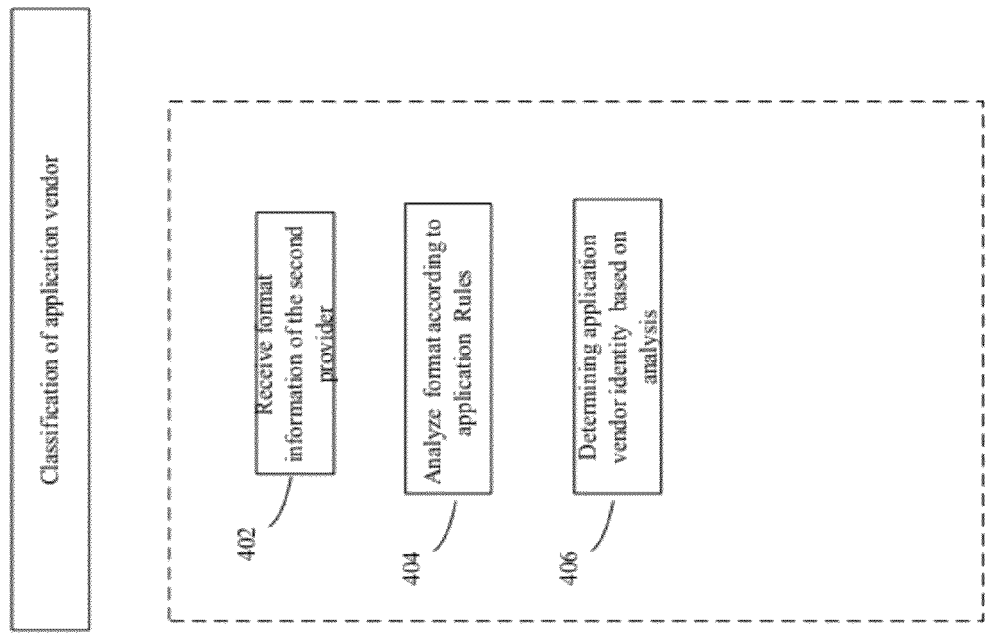
FIG. 4 is a flow chart illustrating the method of Identification of application vendor according to some embodiments of the invention.

FIG. 4 is a flow chart illustrating the method of the Identification of application vendor according to some embodiments of the invention. This second classification module receives format information from the originator peer (step 320) and analyze he information format according to predefined rules (step 322) for identifying the vendor application and its version used by the originator peer.

Figure 5:
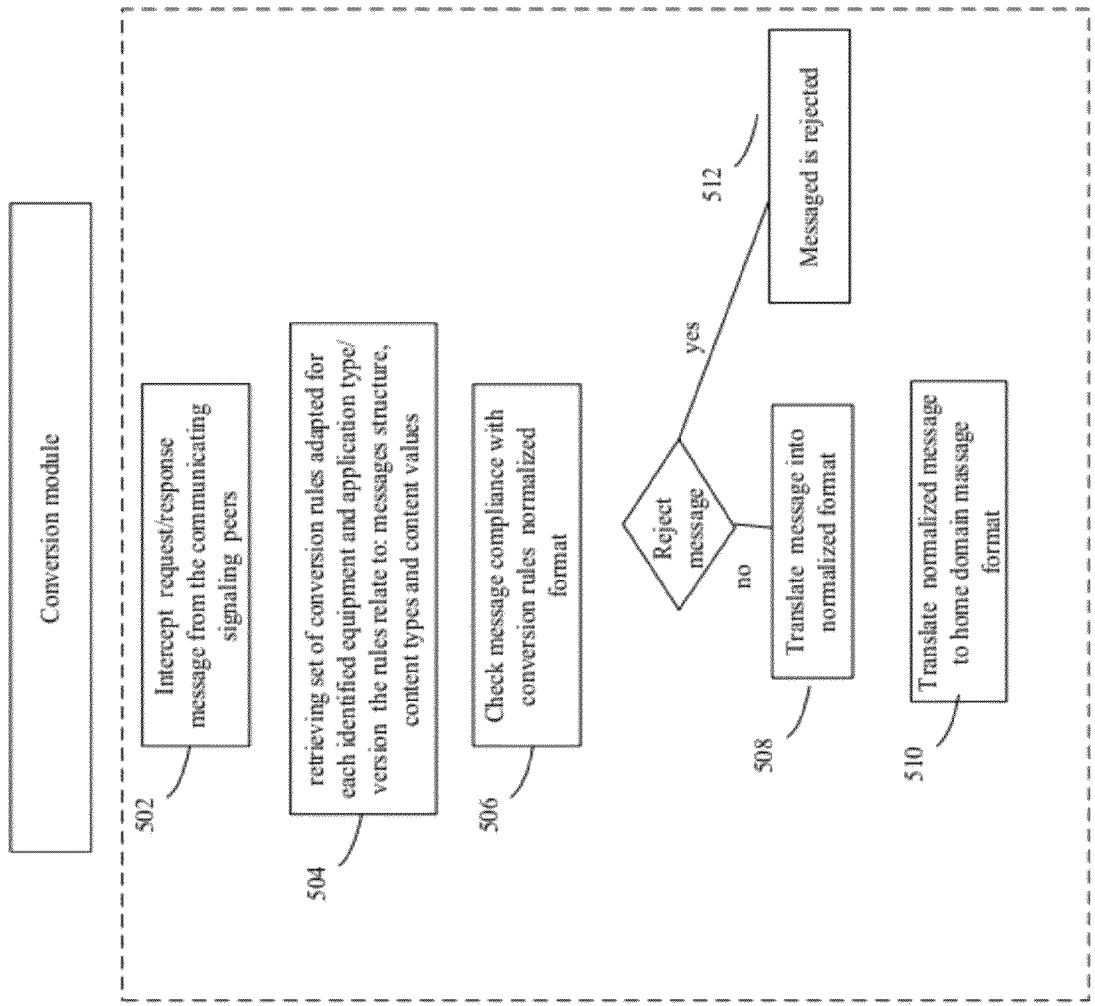
FIG. 5 is a flow chart illustrating the method of Conversion module according to some embodiments of the invention.

FIG. 5 is a flow chart illustrating the method of the Conversion module according to some embodiments of the invention. All request/response message from the originating communicating signaling peers are intercepted by the DNF system (step 502). The conversion module retrieves (step 404) set of conversion rules adapted for each identified equipment and application type/version the rules relate to: messages structure, content types and content values. At first the message format is analyzed, to checked compliance with conversion rules normalized format (step 506), in case the message format is invalid or unknown the message is rejected (step 512), otherwise the conversion rules are applied on the message, translating it into normalized format (step 508). At the last step the normalized format is translated into the home domain format of the receiving signaling server.

Figure 6:
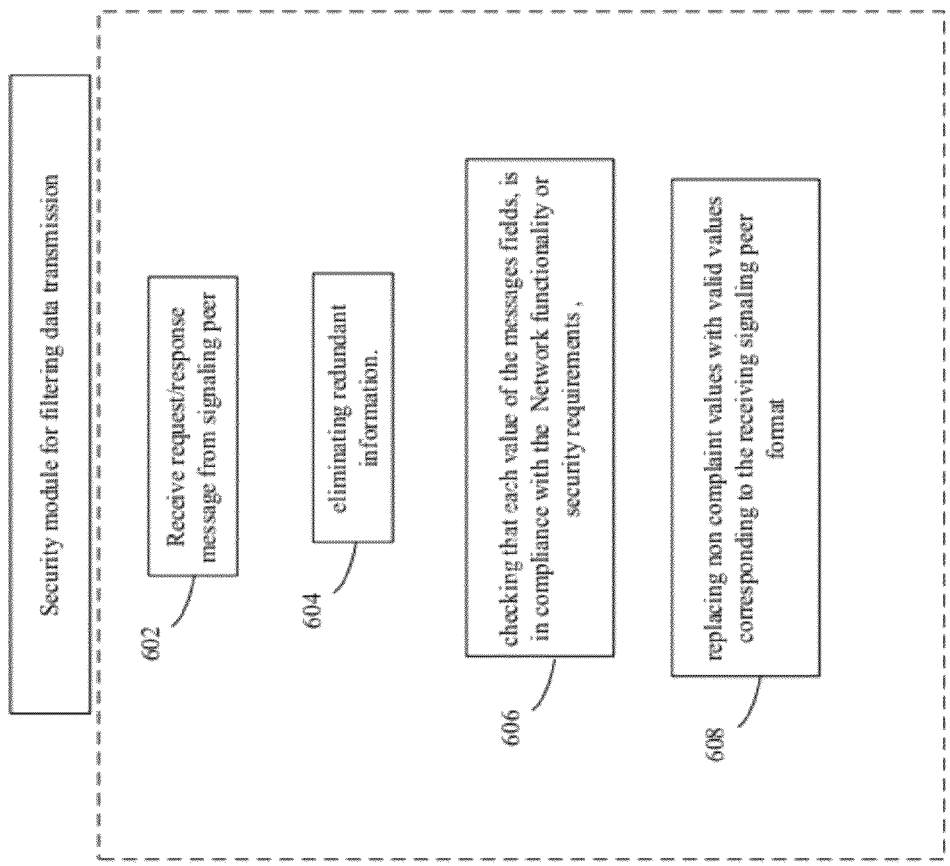
FIG. 6 is a flow chart illustrating the Security module for filtering data transmission according to some embodiments of the invention.

FIG. 6 is a flow chart illustrating the method for filtering data transmission according to some embodiments of the invention. The security module receives the intercepted messages (step 602), identifies and delete redundant information (step 604) and check that each value of the messages fields, is in compliance with the network functionality or security requirements according to security filtering rules 214. The non complaint values are replaced with valid values corresponding to the receiving signaling peer format.(step 608).

Figure 7:
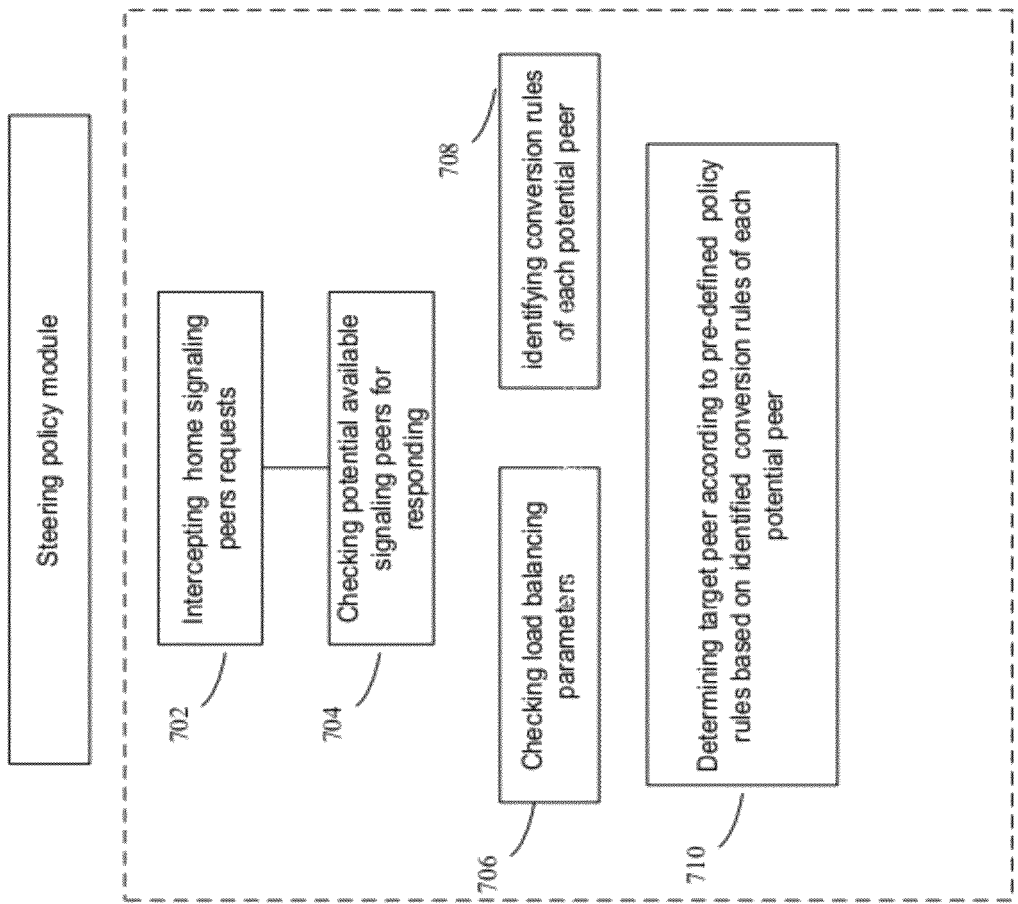
FIG. 7 is a flow chart illustrating the method of Steering policy module according to some embodiments of the invention.

FIG. 7 is a flow chart illustrating the method of the steering policy module according to some embodiments of the invention. The steering policy module intercepts signaling peer requests (step 702) and identifies potential available signaling peers for responding. For determining the target peer the modules check load balancing parameters of each potential peer (step 706) and identifies the conversion rules of each potential peer (step 708). Based on pre-defined policy rules and identified conversion rules of each potential peer the target peer and the corresponding rout path is selected (step 710).

Figure 8:
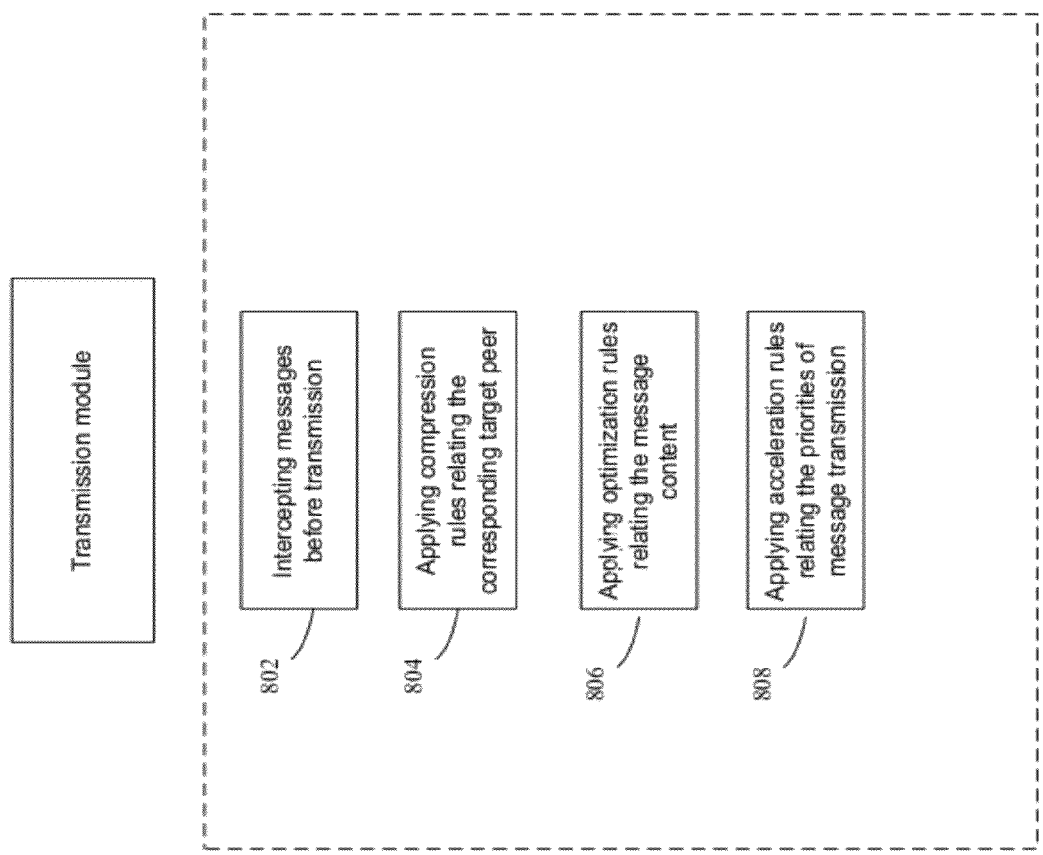
FIG. 8 is a flow chart illustrating the method of the transmission module according to some embodiments of the invention

FIG. 8 is a flow chart illustrating the operation method of the transmission module according to some embodiments of the invention. The transmission module intercepts messages before their transmission (step 802), applies compression rules which are adapted for the communication link related to the route path to the selected target peer (step 804), applies optimization rules on message content (step 806) and applies acceleration rules which includes prioritizing rules for messages transmission (step 808).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A method for mediating between diameter type signaling network peers, the method comprising:
   identifying, by a network peer mediating device, a source equipment type and a release version for signaling network peers based on pre-defined automatic identification and classification rules, wherein each of the signaling network peers is associated with a different telecommunication service provider or a different application vendor;
   classifying, by the network peer mediating device, the application vendor of an implemented diameter application in each of the signaling peers;
   retrieving, by the network peer mediating device, conversion rules adapted for the identified source equipment type or application vendor, wherein the conversion rules adapted for the application vendor comprise message structure rules, content type rules, or content value rules;
   intercepting, by the network peer mediating device, messages of any communication session comprising an exchange of data between the signaling peers of different telecommunication service providers;
   applying, by the network peer mediating device, access control rules for validating the intercepted messages;
   applying, by the network peer mediating device, steering rules on outgoing messages for selecting a destination route of receiving signaling peers;
   applying, by the network peer mediating device, filtering rules to eliminate redundant information in the data exchanged in the at least one communication session;
   applying, by the network peer mediating device, the conversion rules to the intercepted messages to translate between message formats of the different signaling peers.

2. The method of claim 1 wherein the translating process comprises converting the intercepted messages to normalized format and retranslating the normalized messages according to the format of the receiving signaling peers.

3. The method of claim 1 wherein the translation process comprises testing that the message formats are in compliance with the conversion rules relating to at least one telecommunication service provider, wherein non-compliant messages are rejected.

4. The method of claim 1 wherein the filtering rules comprise checking that each value of a messages fields is in compliance with network functionality or security requirements and replacing non-compliant values with valid values corresponding to the receiving signaling peer format.

5. The method of claim 1 wherein the implemented diameter application is a Mobility Management Entity (MME) application.

6. The method of claim 1 wherein the steering rules comprise routing rules or load balancing rules.

7. The method of claim 1 further comprising:
   applying, by the network peer mediating device, at least one or more rules on outgoing messages in accordance with a path route to the selected peer, the one or more rules comprising:

a compression rule,
an acceleration rule, or
an optimization rule.

8. A network peer mediating device comprising:
one or more processors;
a memory, wherein the memory is coupled to the one or more processors which are configured to execute programmed instructions stored in the memory comprising:
identifying a source equipment type and a release version for signaling network peers based on pre-defined automatic identification and classification rules, wherein each of the signaling network peers is associated with a different telecommunication service provider or a different application vendor;
classifying the application vendor of an implemented diameter application in each of the signaling peers based on the pre-defined automatic identification and classification rules;
retrieving conversion rules adapted for each identified equipment type or application vendor, wherein the conversion rules adapted for the application vendor comprise message structure rules, content type rules, or content value rules;
intercepting messages of at least one communication session comprising an exchange of data between the signaling peers of different telecommunication service providers;
applying access control rules for validating the intercepted messages;
applying steering rules on outgoing messages for selecting a destination route of receiving signaling peers;
applying filtering rules to eliminate redundant information in the data exchanged in the at least one communication session;
applying the conversion rules on intercepted messages to translate between message formats of the different signaling servers.

9. The system of claim 8 wherein the translating process includes converting the intercepted messages to normalized format and retranslating the normalized messages according to the format of the receiving signaling peers.

10. The device of claim 8 wherein the translation process includes testing that the message identified format is in compliance with conversion rules relating at least one telecommunication service provider, wherein non-compliant messages are rejected.

11. The device of claim 8 wherein the filtering rules comprise checking that each value of the messages fields is in compliance with network functionality or security requirements and replacing non-compliant values with valid values corresponding to the format of the receiving signaling peers.

12. The device of claim 8 wherein the one or more processors are further configured to execute programmed instructions stored in the memory comprising:
applying at least one rule comprising:
a compression rule based on the route path to the receiving signaling peers,
acceleration rules for prioritizing message transmission, or
optimization rules.

13. The device of claim 8 wherein the steering rules comprise routing rules or load balancing rules.

14. The device of claim 8 wherein the implemented diameter application is a Mobility Management Entity (MME) application.

* * * * *